Patented July 21, 1936

2,048,043

UNITED STATES PATENT OFFICE 2,048,043

METHOD FOR THE PREPARATION OF THIURAM MONOSULPHIDES

Ira Williams and Carlton W. Croco, Wilmington, Del., assignors to E. I. du Pont de Nemours & Company, Wilmington, Del., a corporation of Delaware No Drawing. Application May 6, 1931, Serial No. 535,563

21 Claims. (Cl. 260—123)

This invention relates to a method of producing derivatives of substituted dithio carbamic acids, and more particularly to the preparation of alkyl or aryl substituted thiuram monosulphides.

Various methods of producing thiuram sulphides have been known, and at least two of these have found commercial application. In the first of these methods a solution of the sodium salt of the substituted dithio carbamic acid is cooled and acidified to liberate the free acid, which by oxidation with iodine or hydrogen peroxide is converted into the substituted thiuram disulphide. The disulphide is then converted into the monosulphide by treatment with sodium or potassium cyanide, which acts as a desulphurizing agent. The second of these methods consists in the treatment of the sodium salt of the dithio carbamic acid with cyanogen chloride, which results in the ultimate formation of thiuram monosulphide and alkali thiocyanate. Both of these methods suffer from the serious objection always open to the use of a cyanide and the danger attendant with such use. Moreover, the synthesis of the disulphide and the necessity of converting the disulphide to the monosulphide results in a loss of time, material and money.

An object of this invention is to provide a new and simple method for the production of substituted thiuram monosulphides. A further object is the provision of a method by which the liquid thiuram monosulphides may be prepared in a relatively pure form. A still further object is the elimination of the use of poisonous cyanide compounds. Other objects will appear as this description proceeds.

These objects are accomplished by the present invention, which contemplates the reaction between a dithio carbamic acid salt and phosgene.

In carrying out the methods of this invention a salt of a dithio carbamic acid is first treated with carbonyl chloride. The salt which may be prepared by reacting equivalent quantities of amine, carbon disulphide and alkali should be either suspended or dissolved in a liquid medium, which either will not react or which reacts slowly with carbonyl chloride. In choosing the liquid medium it is convenient to employ one in which one of the products of the reaction is insoluble.

Carbonyl chloride is now led into the solution or suspension which is preferably at a temperature below 50° C. It is also desirable during this period to maintain the liquid medium in a very slightly alkaline condition in order to prevent the liberation of free dithio carbamic acids. Under these conditions the carbonyl ester of the dithio carbamic acid and the metal or alkali chloride are formed according to the following equation:

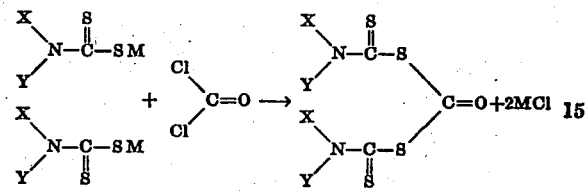

where X is alkyl or aralkyl, Y may be alkyl, aralkyl or aryl and M is a metal or is metallic in nature. In the preferred method which employs the sodium salt with water for the solvent, the sodium chloride will remain dissolved and the insoluble carbonyl ester may be separated. If alcohol, benzene, acetone or similar solvents are used the carbonyl ester will remain dissolved and the sodium chloride may be removed by filtration. The carbonyl esters which are formed by this method are generally yellow solids. Upon being warmed either alone or in solution, the carbonyl esters decompose with the formation of carbon oxy sulphide which is removed as a gas and leaves the thiuram sulphide.

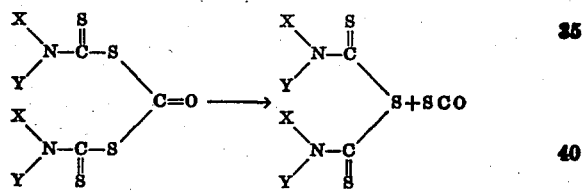

This invention is further illustrated by the following examples:

Example 1

50 grams of sodium dimethyl dithio carbamate were dissolved in 600 cc. of water containing 5 grams of sodium carbonate. The solution was cooled to 10° C. and while being rapidly stirred a slow stream of phosgene gas was passed in. A heavy precipitate was formed immediately. The solution was maintained just alkaline to Clayton yellow paper by the addition of a small amount of sodium hydroxide when necessary. Only a very small amount was required. After about fifteen minutes no further precipitate was formed in a filtered test portion when phosgene was passed in, and the reaction was complete. The precipitate which consisted of the carbonyl ester of dimethyl dithio carbamic acid was filtered off and divided into two portions for conversion to the monosulphide. One portion was washed with cold water and then heated in water to 90° C. for thirty minutes, after which the thiuram monosulphide was filtered out and dried. The resulting product melted at 101° C. without recrystallization. The second portion was filtered as dry as possible on a suction filter and permitted to stand exposed to the air on a porous plate at room temperature for 24 hours. At the end of this time decomposition was complete, and the resulting tetra methyl thiuram monosulphide had a melting point without recrystallization of 103° C.

Example 2

76 grams of carbon disulphide was added to a solution of 40 grams of sodium hydroxide in one liter of water. To this solution 197 grams of dibenzylamine were slowly added with stirring. This solution was then diluted to 3 liters with water, cooled to 5° C. and a current of phosgene gas passed in with stirring. A pasty yellow precipitate was formed immediately and collected on the sides of the vessel and stirrer. The precipitate was collected and dissolved in ether in which it is quite soluble. The ether solution was dried over anhydrous sodium sulphate and filtered. Upon standing at room temperature the carbonyl ester rapidly decomposed, and after an hour the ether was filled with glistening yellow plates of the insoluble tetra-benzyl thiuram sulphide. The crystals melt at 121° C.

Example 3

30 grams of sodium pentamethylene dithio carbamate was dissolved in 200 cc. of water containing two grams of sodium carbonate. This was cooled to 15° and a slow stream of phosgene passed in with stirring for five minutes. The oil which separated was dried and heated to 50°, which caused carbon oxy sulphide to be rapidly evolved and the liquid pentamethylene thiuram sulphide remained.

Example 4

The process of Example 3 was repeated using sodium dibutyl dithio carbamate and forming tetra butyl thiuram sulphide which is liquid.

Example 5

75.6 grams of sodium diethyl dithio carbamate was dissolved in water and phosgene passed in with stirring at ordinary temperature. The yellow solid which separated was removed and washed with water.

It was then covered with water and heated to 50°. The gas evolved was carbon oxy sulphide and the liquid tetra ethyl thiuram sulphide remained as a layer beneath the water. This was removed and dried with anhydrous sodium sulphate.

Example 6

44 grams of sodium phenyl ethyl dithio carbamate was dissolved in alcohol and phosgene passed in for ten minutes. The sodium chloride which formed was filtered off, and the alcoholic solution was concentrated on the steam bath when the yellow crystals of diphenyl diethyl thiuram sulphide separated.

Example 7

44 grams of sodium phenyl ethyl dithio carbamate was ground and placed in 100 cc. of dry carbon tetrachloride in which it is insoluble. 10 grams of phosgene was dissolved in 150 cc. of dry carbon tetrachloride and the two solutions were mixed and stirred. The precipitated sodium chloride was filtered off, and the solution heated to decompose the carbonyl ester and drive off the carbon tetra chloride. The yellow solid diphenyl diethyl thiuram sulphide remained.

Example 8

Other aryl derivatives of dithio carbamate may be employed as well as the phenyl derivatives. Thus, sodium naphthyl ethyl dithio carbamate when placed in solution and treated with phosgene resulted in dinaphthyl diethyl thiuram sulphide.

It is apparent from these descriptions that many variations of this invention can be devised. It is obvious that the reaction might be run in a closed vessel to prevent the escape of any gas, or the phosgene could be introduced as a liquid or in solution in various solvents. It is also obvious that the phosgene might be first dissolved and the sodium salt fed into this solution. While temperatures below 35° C. are preferred when water or alcohol is used as the liquid medium, it is obvious that other means can be employed for reducing the acidity due to the action of phosgene on the liquid. While strong alkali in the presence of moisture will hydrolyze both the carbonyl ester and the thiuram sulphide, it may be possible by continual removal of the precipitate to remove either the carbonyl ester or the monosulphide or a mixture of the two. It is also possible, especially when non-reactive liquids are used, to operate at a temperature high enough to decompose the carbonyl ester as rapidly as formed and produce the monosulphide. It is also understood that a mixture of salts of different dithio carbamic acids may be employed, in which case unsymmetrical thiuram sulphides can be produced.

The methods disclosed in this invention furnish a new and much more direct method of producing thiuram sulphides than those employed before, the danger of employing cyanides is avoided and the reaction may be completed in much shorter time.

Since many embodiments of this invention, differing widely in one or more respects, may be made without departing from the spirit of our invention, it is to be understood that we do not limit ourselves to the foregoing examples or description except as indicated in the following claims.

In the claims below it should be understood that where we speak of a "metal salt" we mean to include in this term also salts formed by radicals of a metallic nature, such as ammonium.

We claim:

1. The process of producing thiuram monosulphides which comprises conducting a reaction between phosgene and a dithio carbamic acid metal salt.

2. The process defined in claim 1, in which a relatively non-reactant solvent is employed for the reaction.

3. The step which comprises heating moderately the product produced by the process defined in claim 1.

4. The process of producing thiuram monosulphides which comprises conducting a reaction between phosgene and a dithiocarbamic acid compound of the general formula

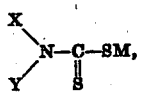

where X stands for alkyl or aralkyl, Y stands for alkyl, aralkyl or aryl, while M stands for a metallic atom or radical.

5. The process of producing thiuram monosulphides which comprises conducting a reaction between phosgene and an alkali metal salt of a dithio carbamic acid compound of the general formula

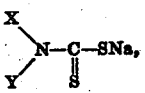

where X stands for alkyl or aralkyl, while Y stands for alkyl, aralkyl or aryl.

6. The process of producing thiuram monosulphides which comprises conducting a reaction between phosgene and an alkali metal salt of an alkyl substituted dithio carbamic acid.

7. The process of producing thiuram monosulphides which comprises conducting a reaction between phosgene and an alkali metal salt of an aryl substituted dithio carbamic acid.

8. The process of producing thiuram monosulphides which comprises conducting a reaction between phosgene and an alkali metal salt of dimethyl dithio carbamic acid.

9. The process of producing thiuram monosulphides which comprises conducting a reaction between phosgene and sodium phenyl ethyl dithio carbamate.

10. The process of producing thiuram monosulphides which comprises conducting a reaction between phosgene and sodium dibenzyl dithio carbamate.

11. In the production of thiuram monosulphides the step of reacting phosgene and a metal salt of a dithio carbamic acid having a substituent from the group consisting of alkyl, aryl and aralkyl.

12. In the production of thiuram monosulphides the step of reacting phosgene and an alkali metal salt of a dithio carbamic acid having a substituent from the group comprising alkyl, aryl and aralkyl.

13. The process of producing a thiuram monosulphide, which comprises reacting with phosgene upon a metal salt of a dithiocarbamic acid to produce the carbonyl ester of said dithiocarbamic acid, and then decomposing this intermediate ester to give the corresponding thiuram monosulphide.

14. The process of producing a thiuram monosulphide, which comprises reacting with phosgene upon a metal salt of a dithiocarbamic acid in a solvent which is relatively inert to phosgene to produce the carbonyl ester of said dithiocarbamic acid, separating the ester from surplus initial materials and by-products and decomposing said ester to give the corresponding thiuram monosulphide.

15. The process of producing a thiuram monosulphide; which comprises reacting with phosgene upon a metal salt of a dithiocarbamic acid in an organic solvent which is relatively inert to phosgene to produce the carbonyl ester of said dithiocarbamic acid and an inorganic salt, separating the solution of said intermediate ester from the precipitated inorganic salt, and heating the solution of said intermediate ester to give the corresponding thiuram monosulphide.

16. The process of producing a thiuram monosulphide, which comprises reacting with phosgene upon an alkali metal salt of a dithiocarbamic acid in an aqueous medium to produce the carbonyl ester of said dithiocarbamic acid, separating said ester from the remaining aqueous solution and decomposing said ester to give the corresponding thiuram monosulphide.

17. A process as in claim 16, the decomposition of said ester being effected by heating.

18. A process as in claim 16, the decomposition of said ester being effected by permitting the same to stand in the open air.

19. The process which comprises reacting with phosgene upon a salt of a dithiocarbamic acid obtainable by reacting with carbon bisulphide on a secondary organic base, in the presence of a solvent being inert to phosgene.

20. The process which comprises reacting with phosgene upon a water soluble salt of a dithiocarbamic acid obtainable by reacting with carbon bisulphide on a secondary organic base, in the presence of water.

21. The process which comprises reacting with phosgene upon a water soluble salt of a compound corresponding in its free form to the formula:

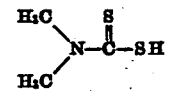

in aqueous solution.

IRA WILLIAMS.
CARLTON W. CROCO.